United States Patent [19]

Hageman

[11] Patent Number: 5,035,678
[45] Date of Patent: Jul. 30, 1991

[54] ENERGY-STORING BICYCLE SPROCKET DRIVE SYSTEM

[75] Inventor: Martin D. Hageman, Freedom, N.Y.

[73] Assignee: Trilach Development Inc., Angola, N.Y.

[21] Appl. No.: 605,101

[22] Filed: Oct. 26, 1990

[51] Int. Cl.$^5$ ............................................. F16H 55/30
[52] U.S. Cl. ..................................... 474/50; 74/594.1; 280/215; 474/69
[58] Field of Search ............................ 474/50, 69, 70; 74/594.1, 594.2, 594.3, 594.4; 280/215

[56] References Cited

U.S. PATENT DOCUMENTS

| | | | |
|---|---|---|---|
| 2,316,530 | 4/1943 | Nilsen | 74/594.3 |
| 3,734,535 | 5/1973 | Sidlauskas | 280/215 |
| 3,995,508 | 12/1976 | Newell | 474/50 |
| 4,108,459 | 8/1978 | Alvigini | 280/215 |
| 4,342,559 | 8/1982 | Williams | 474/50 |
| 4,416,464 | 11/1983 | Mattox | 280/215 |
| 4,468,207 | 8/1984 | Yoshida | 464/66 |
| 4,583,422 | 4/1986 | Boyd | 74/594.2 |
| 4,753,127 | 6/1988 | Baumann | 74/594.1 |
| 4,961,719 | 10/1990 | Wildermuth | 474/50 |

FOREIGN PATENT DOCUMENTS 2558555  7/1985  France .

Primary Examiner—Thuy M. Bui
Attorney, Agent, or Firm—Saperston & Day

[57] ABSTRACT

The present invention is an energy-storing bicycle sprocket drive system which includes a crank which rotates a shaft about the shaft's longitudinal axis. The crank moves through a point of minimum applied leverage and a point of maximum applied leverage in each rotational cycle. Journalled to the shaft is a drive plate having an outer surface with at least one opening. Each opening has an inner surface with at least one end wall. Facing the drive plate is a wheel which rotates freely on the shaft. At least one drive peg is mounted to the wheel such that it is in a position parallel to the longitudinal axis of the shaft. The drive peg extends from the wheel and into the opening of the drive plate. A spring is mounted within the opening between the end wall and the drive peg. As the shaft rotates and the spring is in a compressed state, it stores energy while exerting a first force on the drive peg causing the wheel to revolve as the crank rotates 90 degrees from the point of maximum applied leverage. Whereby as the crank then rotates 90 degrees from the point of minimum applied leverage the spring releases energy, transforms into an extended state, and applies a second force on the drive peg which maintains the wheel's motion.

12 Claims, 3 Drawing Sheets

ENERGY-STORING BICYCLE SPROCKET DRIVE SYSTEM

FIELD OF THE INVENTION

This invention relates to bicycle sprocket drive systems and more specifically to sprocket and chain drive systems with an energy-storing device incorporated into the system.

BACKGROUND OF INVENTION

There have been many attempts to improve the efficiency of a bicycle's operation. One specific focus has been to improve the efficiency of the rider's motive power in order to effectuate an increased speed and a smoother fluctuation of the necessary cyclical movements.

Generally, efficiency is lost through the rotary motion of the rider's foot movements as the foot presses upon the pedal and crank assemblies at various stages of the rotary cycle. The maximum leverage is imparted by a foot when the pedal crank is at the forward horizontal position. Thus, in each rotary cycle there are two points in a full rotation of the crankshaft when the leverage imparted to the pedal crank is maximum. Conversely, in each rotary cycle there are two points when the leverage imparted to the pedal crank from the rider's foot is nil. This point of minimum leverage is developed when the pedal crank is at the vertical position. Sometimes the momentum of the system will carry the pedal crank once again into the forward horizontal position where leverage can again be exerted.

Sprocket wheels resiliently coupled to pedal crank drive systems are known. Most of these known mechanisms utilize torsional springs and, in particular, curved coupling springs for storing and releasing energy in the drive system. U.S. Pat. No. 4,753,127 incorporates this concept into the disclosed design.

However, because torsional springs are subject to the action of a bending moment, which produces a normal stress in the wire, they are most effective when the load is always applied so as to cause the spring to wind up.

Moreover, coupling springs are such that they can only exert the required spring force only if they are large in size, otherwise the energy released to the system will not be sufficient.

Alternatively, mechanisms are known which utilize translational springs. U.S. Pat. No. 2,316,530 crscioses using a translational spring for leverage compensation; however the design is such that it requires one large spring to transmit the needed power. Should the spring fail, the mechanism would be useless. In addition, a single spring does not balance the system whereas a plurality of springs located radially about the crankshaft will. A balanced system is important because it smoothes out the drive pedal fluctuations.

However, U.S. Pat. No. 4,468,207 discloses a plurality of translational springs interposed between two coaxial flywheels, but it does so for the purpose of damping the vibrations of the system.

While there have been prior attempts to store energy and then release it into the drive system at points of low leverage, there still exists a long felt need in the industry to correct cyclical fluctuations which rob the drive system of smoothness and continuous power.

Many of the known mechanisms for releasing energy into a drive system have the added disadvantage of not being easily adaptable to an ordinary bicycle and likewise not easily maintained by the user.

SUMMARY OF THE INVENTION

The desired objects of the invention are achieved by modifying the typical bicycle pedal crank drive assembly as disclosed herein.

In the preferred embodiment the sprocket wheel is mounted to the pedal crankshaft such that it freely rotates. In addition, drive pegs are mounted to the sprocket wheel at equiangular intervals around the sprocket wheel.

A drive plate is journalled to the crankshaft and faces the sprocket wheel. The drive plate has kidney-shaped openings on its outer surface into which the drive pegs of the sprocket wheel extend.

Within each kidney-shaped opening a spring keeper rod is mounted, on which is threaded a helical coil spring.

With the pedal in the forward horizontal position (i.e., the point of maximum applied leverage), and as a clockwise rotational cycle of the pedal crank begins, the drive plate rotates correspondingly and exerts a force on the helical spring. This force causes the spring to compress against the drive peg and impart to it a force which in turn drives the sprocket wheel.

When the pedal has moved into the bottom position (i.e., the point of minimum applied leverage), the drive plate no longer exerts the same force on the spring. This lesser force causes the spring to extend. As the spring extends, it releases energy to maintain the force needed to drive the sprocket wheel.

This process repeats itself in the second half of the rotational cycle.

Accordingly, an overall object of this invention is to provide a bicycle drive system that will substantially smooth drive power fluctuations.

A further object of this invention is to provide an energy-storing drive system that will release energy to supplement low power points in the drive cycle.

Still a further object of this invention is to provide a practical means for storing and releasing the drive energy in a plurality of small elements rather than one or a few large elements.

Another object is to provide a means for improving the efficiency of bicycle operation which can easily be adapted to standard existing bicycles without either major modifications or substantial cost.

These and other objectives are embodied and achieved in the invention described herein, as will be seen in the following descriptions.

DETAILED DESCRIPTION OF THE PREFERRED EMBODIMENT

Figure 1:
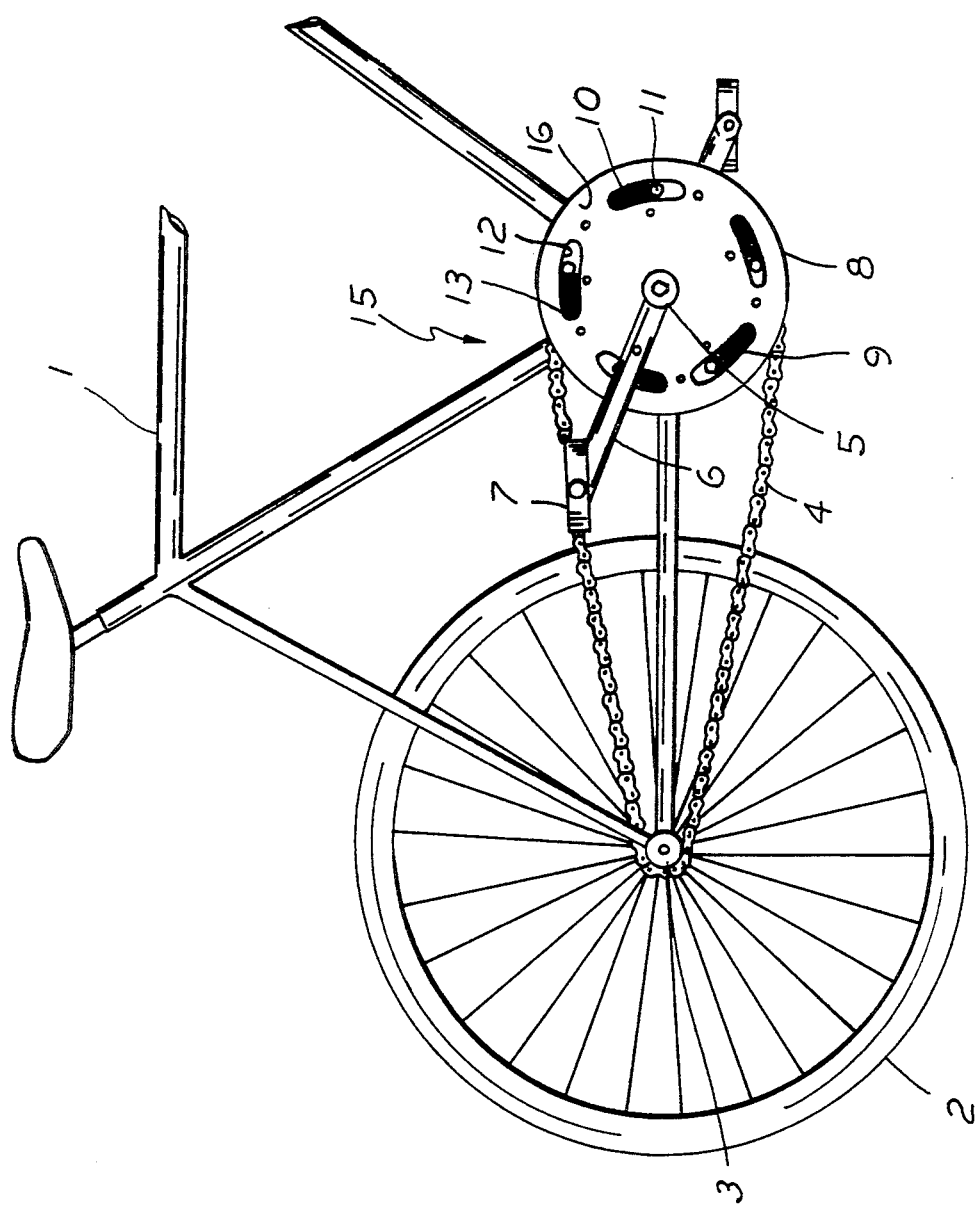
FIG. 1 is a partial side view of a bicycle frame with the energy-storing bicycle sprocket drive system mounted to the pedal crankshaft.

FIG. 1 is a partial cutaway view showing standard bicycle diamond frame 1 with rear drive wheel 2 mounted to the frame at wheel hub 3 and driven in a typical fashion by drive chain 4. In turn, the drive chain is driven by sprocket wheel 20 (shown in FIG. 2). Pedal crank assembly 15 is supported by the frame and comprised of pedal 7 attached to pedal crank 6 mounted to crankshaft 5. The foot power imparted by the rider is a levered force which acts on the pedal and is transmitted through the pedal crank to the crankshaft. Drive plate 8 is journalled to the crankshaft. Outer surface 16 maintains five kidney-shaped openings 12 in each of which is seated translational spring 9. Each spring is maintained within kidney-shaped opening 12 by spring keeper rod 10. The spring keeper rod is mounted to end wall 13 of inner surface 14 (shown in FIG. 2). When the pedal crank is in motion, the translational spring engages drive peg 11. The kidney shape of the opening is preferred because it is conducive to the motion of the drive peg. Each drive peg is mounted to sprocket wheel 20 (shown in FIG. 2). The design of this invention enables energy to be stored within the translational springs at high leverage points of the rotational cycle and released at low leverage points.

Figure 2:
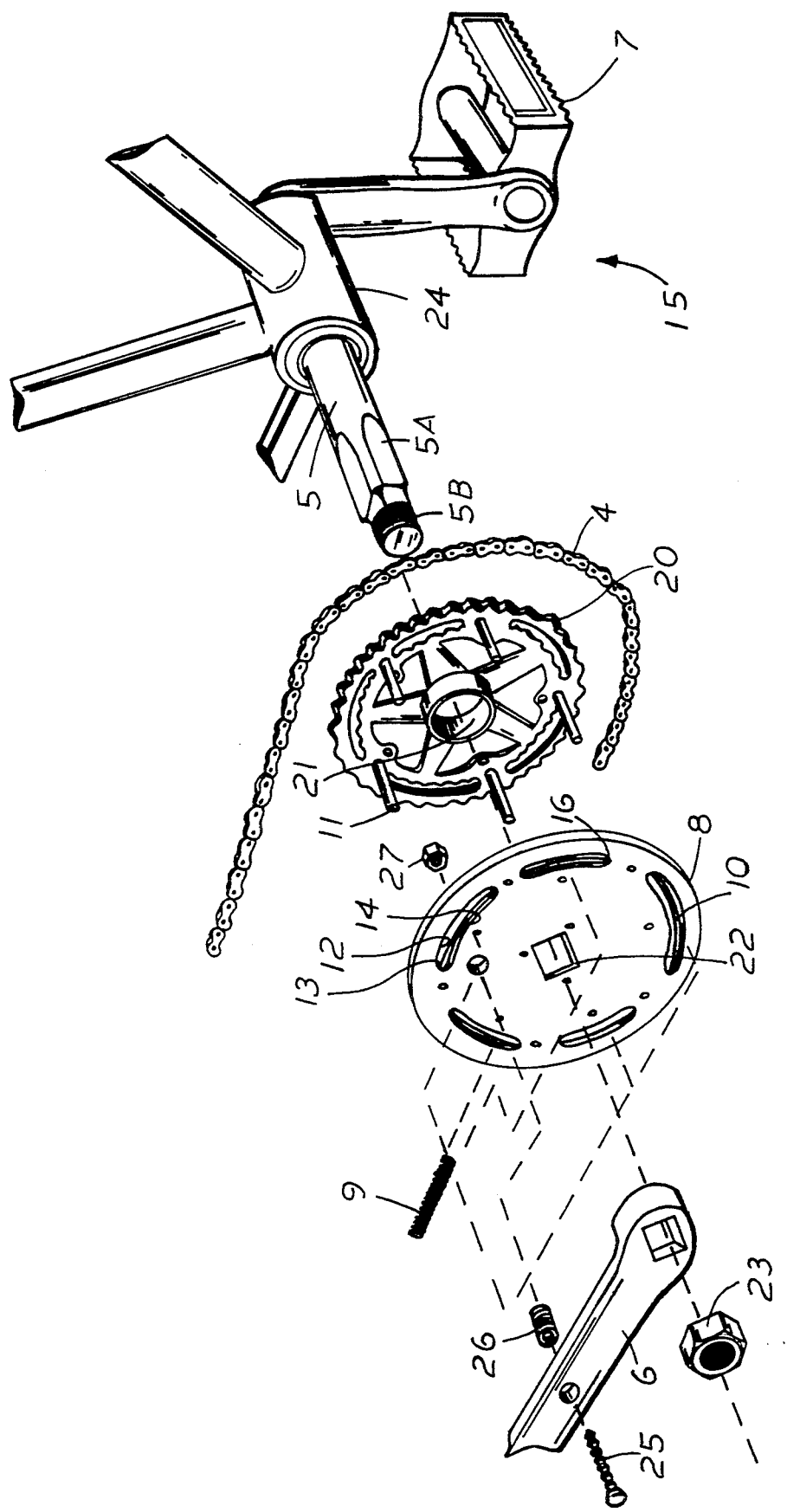
FIG. 2 is an exploded view of the energy-storing bicycle sprocket drive system and the pedal crank assembly.

FIG. 2 is an exploded view of the energy-storing bicycle sprocket drive system which exposes the relationship between the pedal crank assembly 15 (i.e., pedal 7, pedal crank 6, crankshaft 5), drive plate 8, and sprocket wheel 20. The sprocket wheel engages drive chain 4, thereby causing rear drive wheel 2 (shown in FIG. 1) to rotate. In the present invention sprocket wheel hub 21 turns freely on the crankshaft. This design requires that the drive power imparted by the pedal crank to the crankshaft be transferred indirectly to the sprocket wheel. This indirect transfer is accomplished through drive peg 11 which extends from the sprocket wheel and through kidney-shaped openings 12 in drive plate 8.

The kidney-shaped openings expose end wall 13 of inner surface 14. Mounted to the end wall is spring keeper rod 10 onto which is threaded helical coil spring 9.

As the crankshaft rotates the drive plate in a clockwise direction, the spring imparts the rotary power of the drive plate to the sprocket wheel by imparting a force on the drive peg. When the spring is in a compressed state (as shown in FIG. 3A), it imparts a first force from the drive plate, but when it is in an extended state (shown in FIG. 3B), it imparts a second force to the drive peg.

This indirect transfer of power is further facilitated by the design of the crankshaft. Flat surface 5A of the crankshaft is flattened to receive square drive hole 22 of the drive plate, and round surface 5B of the crankshaft is threaded to receive retaining nut 23. This design journals the drive plate to the crankshaft and retains the components between the two pedal cranks. One pedal crank is mounted outward some distance from the square drive hole onto the drive plate and is secured by bolt 25 in order to add to the invention's rigidity. Bolt 25 passes through the pedal crank, spacing sleeve 26, the drive plate, and threads into retaining nut 27 to secure the assembly.

Figure 3A:
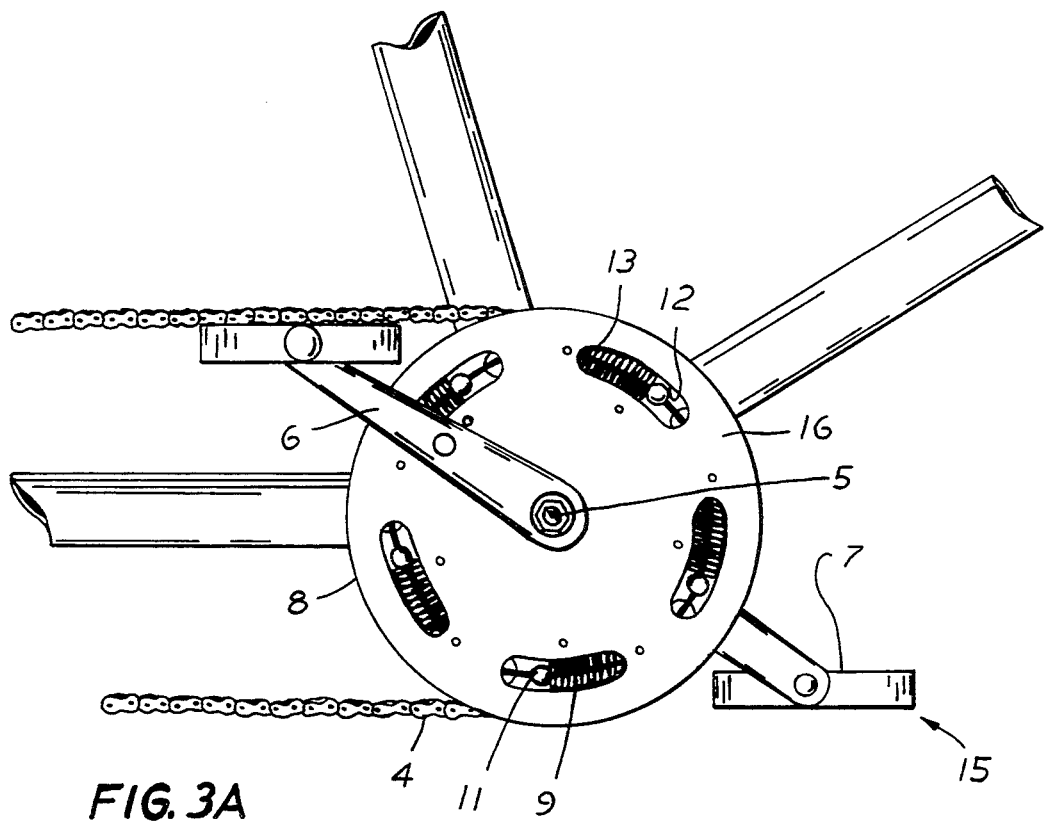
FIG. 3A is a cutaway side view showing the assembled energy-storing bicycle sprocket drive system after the pedal crank has just passed through the point of maximum applied leverage and as it is about to reach the point of minimum applied leverage.

FIG. 3A is a cutaway side view of the assembled energy-storing bicycle sprocket drive system. As pedal crank 6 is in the horizontal position through 90 degrees of rotation to the vertical position (also known as the point of minimum applied leverage), a maximum foot leverage is exerted on pedal 7. However, the amount of leverage is continuously decreasing through the 90 degrees of rotation. As the power imparted to the pedal rotates crankshaft 5 clockwise, spring 9 will be compressed by end wall 13 against drive peg 11. Since the drive pegs are mounted to sprocket wheel 20 (shown in FIG. 2), the movement of drive plate 8 will in turn drive the sprocket wheel (shown in FIG. 2). In its compressed state, the spring imparts a first force to the drive peg from the drive plate.

As FIG. 3A shows, in the preferred embodiment there are five sets of drive pegs and spring assemblies, each set being located within one of the five kidney-shaped openings. Kidney-shaped openings 12 are positioned at several equiangular intervals around the drive plate. By placing the springs in series with one another they experience the same angular velocity and each spring bears an equivalent portion of the applied torque. Thus, energy absorption is derived at balanced intervals around the plane of rotation, and each spring absorbs only a portion of the available energy. If a smaller number of springs were used, they would have to be proportionally larger in size in order to absorb sufficient energy.

Figure 3B:
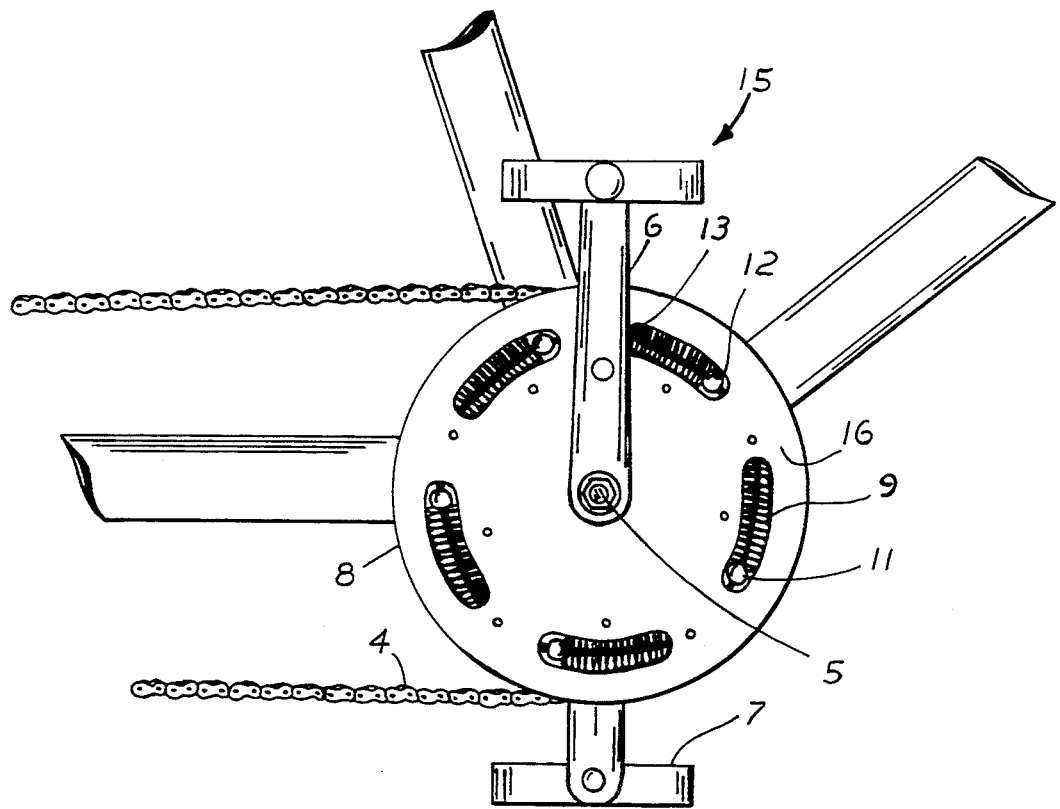
FIG. 3B is a cutaway side view of the energy-storing bicycle sprocket drive system with the pedal crank positioned at the point of minimum applied leverage in the rotary cycle, wherein energy is released into the system by the extension of the springs.

In FIG. 3B a cutaway side view of the assembled energy-storing bicycle sprocket drive system is shown with pedal crank 6 in the vertical position. This position corresponds to the point of minimum applied leverage to pedal 7. As the pedal crank rotates 90 degrees towards the horizontal position (also known as the point of maximum applied leverage), the amount of applied leverage increases. This variance in leverage occurs because the foot makes its most powerful stroke by vertical movement, which in the context of the bicycle occurs when the pedal crank is in the horizontal position. Thus, since a pedal crank which is in the vertical position must be moved by a force at a horizontal tangent to it, not a vertical tangent, the leverage imparted is minimum. As the tangent to the angular motion becomes increasingly vertical, the leverage applied increases as well.

However, in the position reflected by FIG. 3B, the first force supplied by drive plate 8 has diminished such that it can no longer maintain the spring in a compressed state. This being so spring 9 expands, releasing the stored energy as a second force applied over a distance. The second force is applied to drive peg 11 causing the drive peg to rotate forward. As the drive peg moves forward, the pedal crank will move to the horizontal position where leverage can once again be effectively exerted.

In an alternate embodiment of the invention, the crank could be a hand-powered crank, instead of a foot-powered crank. The present invention could easily be implemented to smooth out the fluctuations in the hand-powered rotary motion.

In addition, while a sprocket wheel and chain combination is preferred, the present invention could utilize a flywheel and drive belt combination as well.

While in the preferred embodiment the crankshaft rotates clockwise, the present invention can be implemented to accommodate a counterclockwise rotating crankshaft.

I claim:

1. An energy-storing bicycle sprocket drive system comprising:
   (a) a shaft having a longitudinal axis;
   (b) a crank operatively arranged to rotate said shaft about the longitudinal axis,
   said crank having a rotational cycle wherein said crank moves through a point of minimum applied leverage and a point of maximum applied leverage in the rotational cycle;
   (c) a drive plate journalled to said shaft such that said drive plate rotates about said longitudinal axis,
   said drive plate having an outer surface;
   said outer surface having at least one opening;
   said opening having an inner surface of the drive plate; and
   said inner surface having at least one end wall;
   (d) a wheel facing the drive plate, freely rotatable about the longitudinal axis of the shaft;
   (e) at least one drive peg mounted to said wheel such that said drive peg is positioned parallel to said longitudinal axis wherein said drive peg extends into the opening causing the wheel to interlock with the drive plate; and
   (f) a spring mounted within the opening between the end wall and the drive peg,
   said spring having a compressed state and an extended state wherein in said compressed state the spring stores energy and exerts a first force on the drive peg causing the wheel to revolve as the crank passes through the point of maximum applied leverage; and
   whereby as the crank passes through the point of minimum applied leverage, the spring releases energy causing the spring to transform into the extended state while applying a second force on the drive peg.

2. An energy-storing bicycle sprocket drive system as recited in claim 1 wherein said spring is a translational spring.

3. An energy-storing bicycle sprocket drive system as recited in claim 2 wherein the spring is a helical coil spring.

4. An energy-storing bicycle sprocket drive system as recited in claim 1 wherein said wheel is a sprocket wheel which engages a drive chain and said drive chain engages a wheel hub, said wheel hub being an integral part of the rear bicycle wheel.

5. An energy-storing bicycle sprocket drive system as recited in claim 4 wherein there are five openings positioned at equally-spaced intervals around the drive plate and corresponding five springs mounted within the openings along with five drive pegs inserted into the openings.

6. An energy-storing bicycle sprocket drive system as recited in claim 1 wherein there are a plurality of openings positioned at equiangular intervals around the drive plate, and a corresponding plurality of springs and drive pegs.

7. An energy-storing bicycle sprocket drive system as recited in claim 1 wherein said wheel is a flywheel which engages a drive belt.

8. An energy-storing bicycle sprocket drive system as recited in claim 1 further comprising a spring keeper rod mounted to the end wall of the inner surface of the opening.

9. An energy-storing bicycle sprocket drive system as recited in claim 1 wherein said crank is a pedal crank supported by a diamond frame.

10. An energy-storing bicycle sprocket drive system as recited in claim 9 wherein said opening is kidney shaped.

11. An energy-storing bicycle sprocket drive system as recited in claim 1 wherein the crank is a hand crank.

12. An energy-storing bicycle sprocket drive system comprising:
    (a) a drive pedal assembly supported by a diamond frame, having at least one pedal crank mounted to a crankshaft;
    (b) a sprocket wheel which rotates freely on said crankshaft wherein at least one drive peg is mounted perpendicularly to said sprocket wheel,
    said sprocket wheel engages a drive chain which in turn engages a wheel hub wherein the wheel hub is an integral part of a rear drive wheel;
    (c) a drive plate journalled to the crankshaft,
    said drive plate having at least one opening into which the drive peg extends; and
    said opening having an inner surface and at least one end wall;
    (d) a spring keeper rod located within each opening and mounted to the end wall; and
    (e) a helical coil spring threaded onto the spring keeper rod.

* * * * *